H. MILLINGAR.
MECHANICAL-MOVEMENT.
No. 177,873.　　　　　　　　　Patented May 23, 1876.
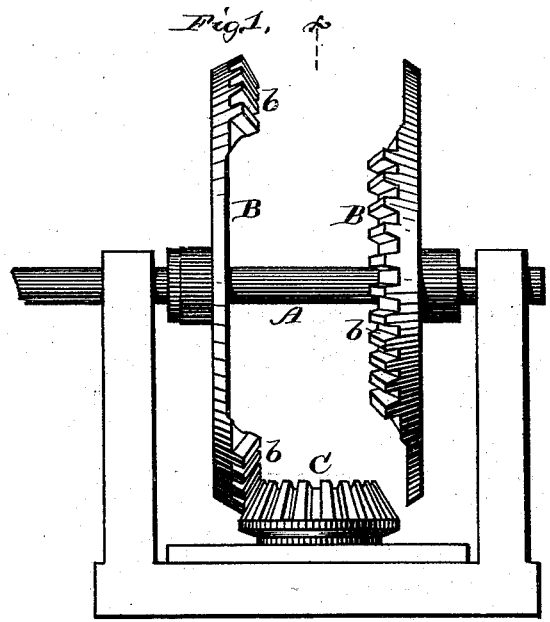
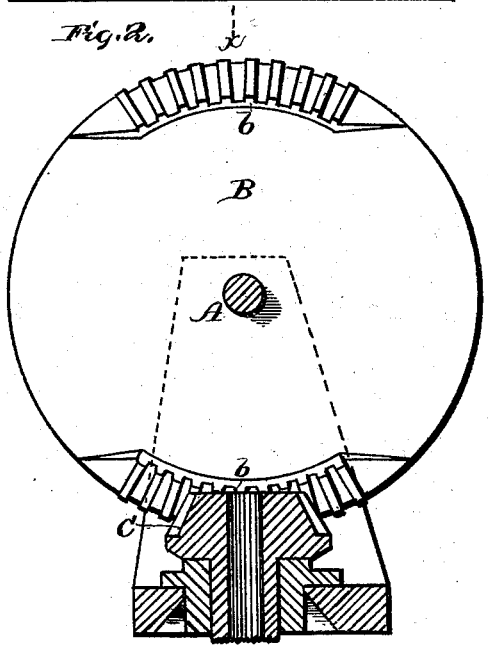
Witnesses:
Jas. F. Duhamel,
Thomas Byrne.
Inventor
H. Millingar
per
H. S. Abbot,
Attorney.

UNITED STATES PATENT OFFICE.

HENRY MILLINGAR, OF PITTSBURG, PENNSYLVANIA, ASSIGNOR OF ONE-HALF HIS RIGHT TO JAMES S. THOMPSON, OF SAME PLACE.

IMPROVEMENT IN MECHANICAL MOVEMENTS.

Specification forming part of Letters Patent No. 177,873, dated May 23, 1876; application filed April 10, 1876.

*To all whom it may concern:*

Be it known that I, H. MILLINGAR, of Pittsburg, in the county of Allegheny and State of Pennsylvania, have invented certain new and useful Improvements in Mechanical Movements, of which the following is a specication:

My invention relates to mechanical movements; and it consists in two mutilated wheels fixed upon the same shaft and revolving continuously in the same direction, to give a continuous reverse movement to a wheel or pinion placed between them, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a side view of my invention, and Fig. 2 is a cross-section of the same.

A represents a shaft revolving in suitable bearings, and upon which are secured two wheels, B B, revolving with the shaft. These wheels are, on their inner sides at the rim, provided with segments $b\ b$ of cogs, which are arranged to alternate on the two wheels, and making what I call mutilated wheels. Between the two wheels is arranged a pinion, C, into which the cogged segments $b$ take alternately, so that as the wheels B revolve in one direction continuously, the pinion will be revolved by one of them in one direction and then by the other in the opposite direction, and so on.

It is of course evident that it is not essentially necessary to use cog-gearing, but that two mutilated friction-wheels, operating alternately on an intermediate friction-wheel, will answer the same purpose.

This movement may be applied to any machinery where a reverse motion is required.

Having thus fully described my invention, what I claim as new, and desire to secure by Letters Patent, is—

Two mutilated wheels secured on the same shaft, and operating alternately upon an intermediate wheel or pinion, to give the same an alternating rotating motion, substantially as herein set forth.

In testimony that I claim the foregoing as my own I affix my signature in presence of two witnesses.

HENRY MILLINGAR.

Witnesses:
JAMES S. THOMPSON,
JAMES BLACK.